United States Patent [19]
Harrison, Jr.

[11] Patent Number: 5,825,719
[45] Date of Patent: Oct. 20, 1998

[54] DUAL-PORT AIR GUN HAVING A SINGLE SHUTTLE

[75] Inventor: Earnest R. Harrison, Jr., Plano, Tex.

[73] Assignee: Input/Output, Inc., Stafford, Tex.

[21] Appl. No.: 951,258

[22] Filed: Oct. 16, 1997

[51] Int. Cl.⁶ ................................................ H04R 23/00
[52] U.S. Cl. ........................................... 367/144; 181/120
[58] Field of Search ............................ 367/144; 181/115, 181/120

[56] References Cited

U.S. PATENT DOCUMENTS

| | | | |
|---|---|---|---|
| 4,712,202 | 12/1987 | Chelminski | 367/144 |
| 4,779,245 | 10/1988 | Chelminski | 367/144 |
| 5,018,115 | 5/1991 | Pascouet | 367/144 |
| 5,646,909 | 7/1997 | Bouyoucos | 367/144 |
| 5,646,910 | 7/1997 | Bouyoucos | 367/144 |

FOREIGN PATENT DOCUMENTS 2204129  11/1988  United Kingdom ................... 367/144

OTHER PUBLICATIONS

Bolt PAR Air Gun brochure, pp. 1–30.

*Primary Examiner*—Ian J. Lobo
*Attorney, Agent, or Firm*—Tim Headley; Haynes and Boone, L.L.P.

[57] ABSTRACT

A seismic air gun includes a body, a main chamber, two ports, several air passageways, a shuttle, a return device, and a firing device. The main chamber is within the body. The two ports are in the main chamber. The ports lie along a common axis. The air passageways connect a high pressure air source to the return device, the main chamber, and the firing device. The shuttle slides along the common axis between an open position, in which the main chamber is open, and a closed position, in which the main chamber is closed. The return device biases the shuttle toward the closed position. The firing device causes the shuttle to move from the closed position to the open position whereby pressurized air is released simultaneously from the two ports and in opposite directions.

22 Claims, 4 Drawing Sheets

DUAL-PORT AIR GUN HAVING A SINGLE SHUTTLE

BACKGROUND

This invention relates generally to seismic air guns which generate a seismic shock wave for seismic exploration, and more particularly, to an in-line double-ported seismic air gun using a single shuttle for opening both ports.

In an underwater environment, a seismic air gun creates an air bubble of highly compressed air which expands from a highly compressed state to a lesser compressed state within a short period of time to create a seismic shock wave. U.S. Pat. No. 5,001,679 to Harrison, the contents of which are incorporated into this specification by reference, discloses a representative air gun.

To increase the acoustic pressure generated by an air gun, dual shuttle air gun designs were developed which use two independent shuttles or valves. These dual-shuttle air guns can generate the acoustic pressure of two air guns, by doubling the port area. Because physical characteristics, such as friction factors, vary between the two shuttles, some loss of shuttle synchronization is inherent in dual-shuttle designs. The variation can sometimes be large, resulting in asynchronous discharges when the shuttles open. This results in a time offset between the two acoustic pressure signals which the shuttles generate.

Not only can the resulting time offset in the discharge between shuttles vary on the shot, the time offset between the two acoustic pressure signals can vary from shot to shot. This can result in attenuation of the summed acoustic pressure signal. Such summing primarily affects the higher frequencies of the acoustic spectra. Further, asynchronous discharges result in an undesirable recoil of the air gun.

Most dual-shuttle designs require an additional sensor for the added shuttle so that both shuttle operations can be monitored. Otherwise, the sticking of one shuttle may go undetected and consequently, the fact that one shuttle is jammed and the air gun is generating only half of the acoustic pressure, may go undetected.

Therefore, what is needed is an air gun which increases acoustic pressure while limiting the possibility of asynchronous discharges between the ports, thus ensuring consistency and maximizing acoustic output.

SUMMARY

A seismic air gun utilizes a single shuttle to simultaneously release two bursts of pressurized air in opposite directions. The seismic air gun includes a body defining a pressurized air inlet, and a main chamber having two ports. A shuttle is mounted in the body and is responsive to pressurized air so as to move between an open position and a closed position. A return device in the body is responsive to pressurized air to move the shuttle to the closed position. A firing chamber adjacent to the main chamber into which pressurized air is selectively injected, moves the shuttle to the open position, releasing air through the two ports and into a surrounding environment.

A principal advantage of this embodiment is that it provides an in-line, double-ported air gun that uses a single shuttle valve. A single shuttle valve synchronizes the two exhaust ports, thus obtaining maximum acoustical pressure from the gun, and a balanced thrust which prevents an undesirable recoil. The single shuttle also requires only one shuttle sensor for monitoring shuttle movement.

DETAILED DESCRIPTION OF THE PREFERRED EMBODIMENT

Figure 1:
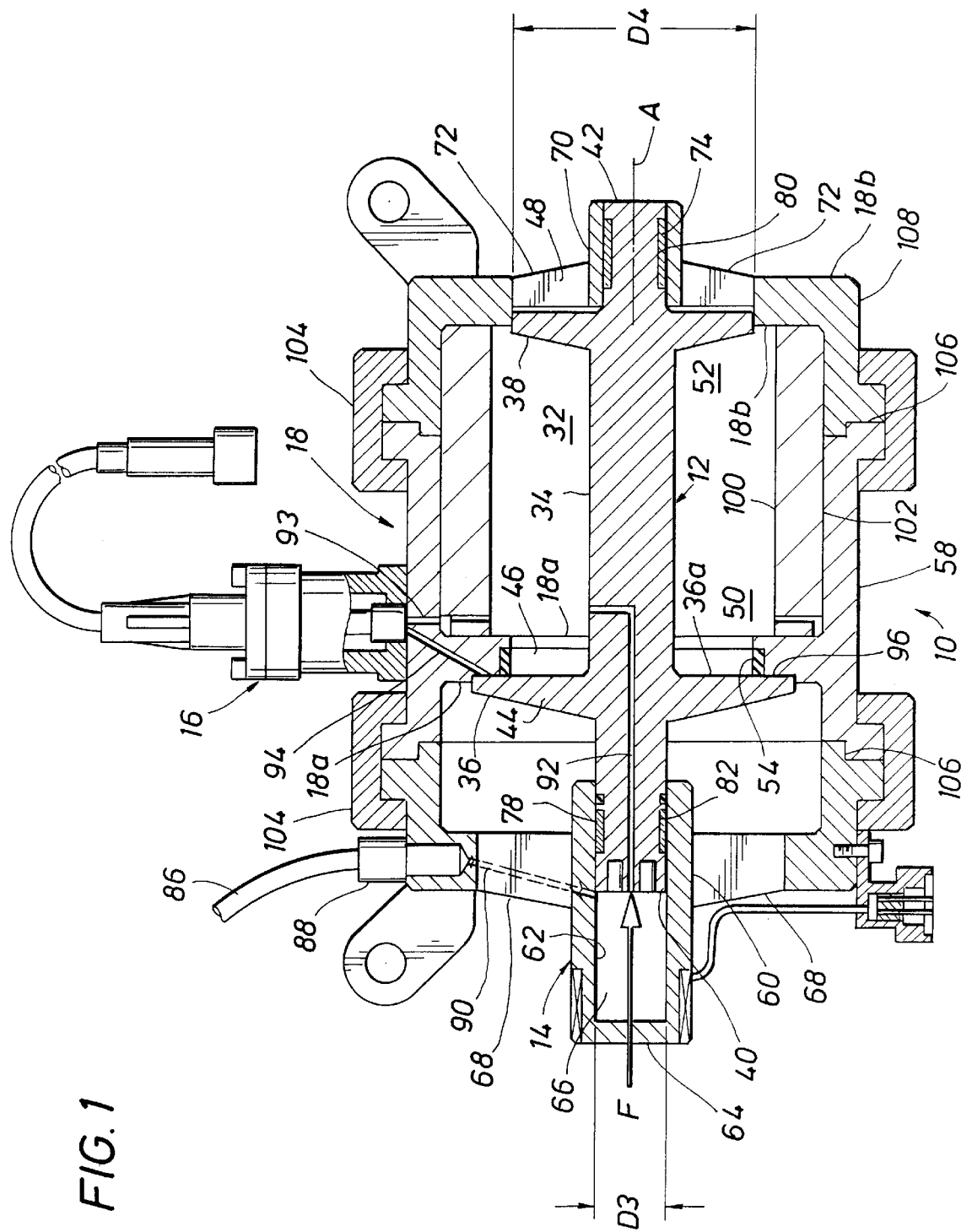
FIG. 1 is a cross-sectional side view illustrating an embodiment of a dual-port air gun in a closed position.
Figure 1A:
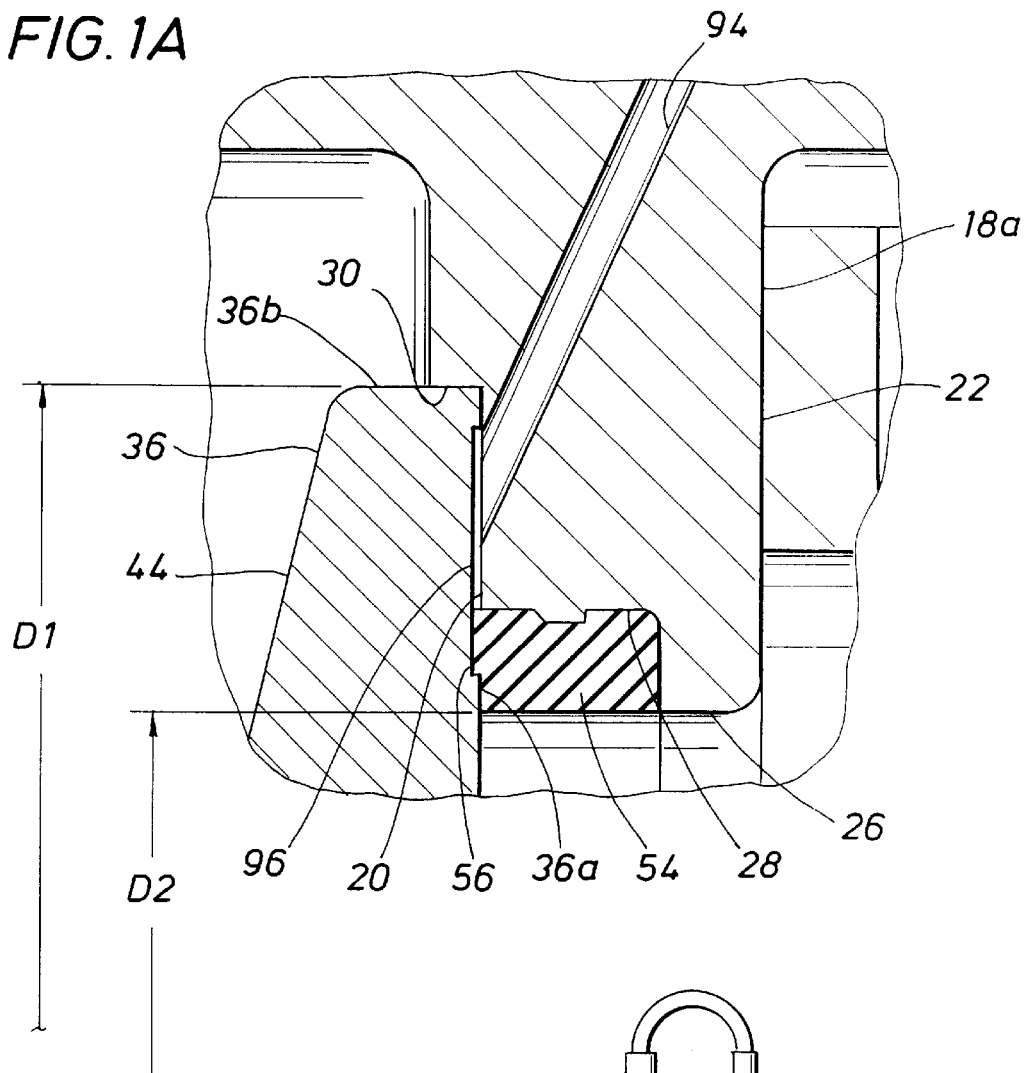
FIG. 1A is an enlarged partial view illustrating a portion of the dual-port air gun of FIG. 1.

Referring to FIGS. 1 and 1A, a dual-port air gun 10 is illustrated including a valve or shuttle 12, a shuttle return device 14, a solenoid 16, and a cylindrical, hollow body 18 having an annular, internal shoulder or flange 18a, and an annular end shoulder 18b. Internal shoulder 18a includes a main face 20, FIG. 1A, an opposite face 22, an annular surface 26 into which an annular recess 28 is formed, and an annular lip 30 which defines the outermost limit of the main face 20. The body 18, FIG. 1, and the shuttle 12 define a main chamber 32, between the internal shoulder 18a and the end shoulder 18b. The shuttle 12 has a shaft portion 34, a primary flange 36, and a secondary flange 38, spaced apart from the primary flange, each flange 36, 38 radially extending from the shaft portion 34 near a pair of spaced apart opposite shaft ends 40 and 42, respectively. The primary flange 36, FIG. 1A, has a sealing face 36a, an outer, annular surface 36b, and a conical face 44, opposite the sealing face 36a.

Figure 1B:
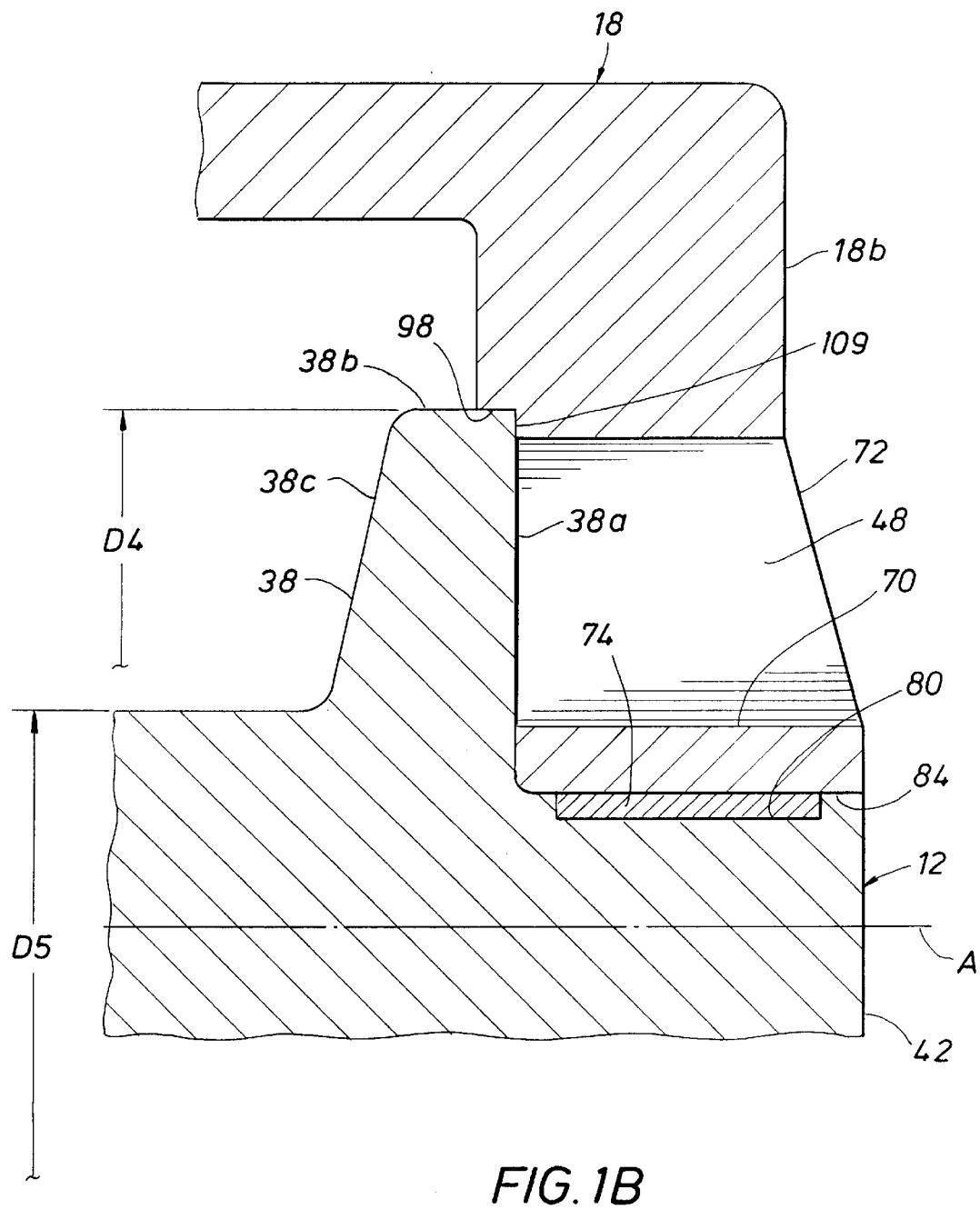
FIG. 1B is an enlarged partial view illustrating another portion of the dual-port air gun of FIG. 1.

In FIG. 1B, the secondary flange 38 has a sealing face 38a, an outer annular surface 38b, and a conical face 38c. The shoulders 18a and 18b, FIG. 1, and the flanges 36 and 38 define ports 46 and 48, respectively, at opposite ends 50 and 52 of the main chamber 32. A main face seal 54, Fig. 1a, includes a surface 56 which seals the port 46 when the sealing face 36a of the primary flange 36 closes against the main face 20 of the shoulder 18a. The solenoid 16, FIG. 1, mounts on an outer wall 58 of the outer body 18 and operates in a manner to be described below. When the shuttle 12 is in a closed position, as shown, the primary and secondary flanges 36 and 38 seal the primary and secondary ports 46 and 48, respectively, thus sealing the main chamber 32.

Figure 2:
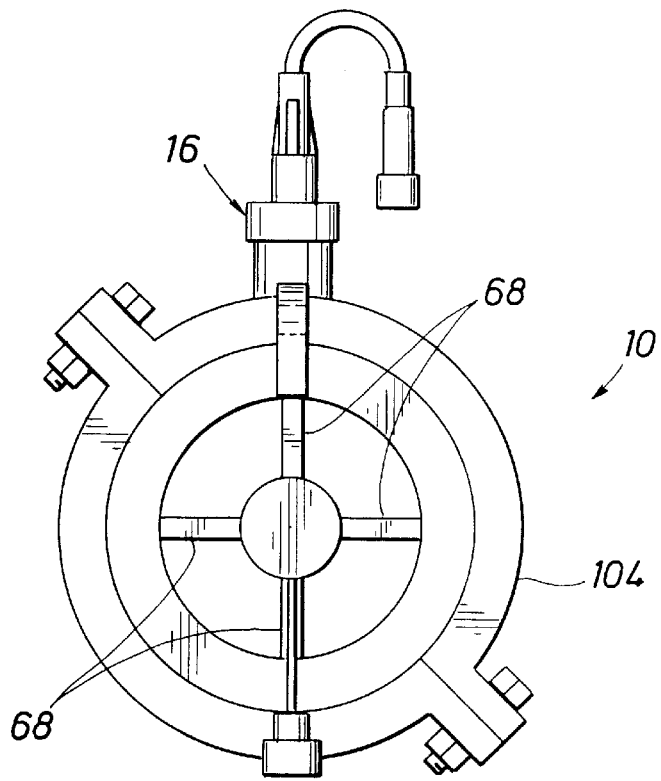
FIG. 2 is an end view illustrating the air gun of FIG. 1.

The shuttle return device 14 includes a chamber housing 60, having a cylindrical inner surface 62, which slidably engages with the end 40 of shuttle 12, and also includes an end wall 64. The end wall 64, the inner surface 62, and the shuttle end 40 define a return chamber 66. A first plurality of support gussets 68, FIGS. 1 and 2, support the chamber housing 60 in a central position with respect to the outer body 18.

A cylindrical receiver 70, FIGS. 1 and 1B, includes an inner surface 84 which supports the end 42 of shuttle 12. A second set of support gussets 72 support the cylindrical receiver 70 in a central position with respect to the outer body 18. Wear rings 74 and 78 are received within grooves 80 and 82 at opposite ends of the shaft portion 34 for sliding contact with the inner surfaces 84 and 62 of the cylindrical receiver 70 and chamber housing 60, respectively.

Referring again to FIG. 1, a supply line 86 connects an on-deck compressor (not shown) to an air inlet 88 on the air gun 10. A connecting passage 90 connects the return chamber 66 to the air inlet 88. A small passageway 92, in the center of the shuttle 12, connects the return chamber 66 to the main chamber 32. The solenoid 16 electrically connects to a trigger (not shown). A passageway 93 connects main chamber 32 to solenoid 16 and a passageway 94 connects the solenoid 16 to a firing chamber 96, Fig. 1a, thus defining a firing mechanism. The firing chamber 96 is a narrow annular recess formed on the main face 20, in a region between the lip 30 and the face seal 54. A second lip 98, FIG. 1B, is formed on the shoulder 18b. The lips 30 and 98, FIGS. 1A and 1B, are annular surfaces which slidably engage with the surfaces 36b and 38b, respectively, permitting a limited amount of axial motion of the shuttle 12 prior to opening the main chamber 32, FIG. 1.

Referring to FIG. 1, the volume of the main chamber 32 is fixed. A chamber insert 100 may be installed in the main chamber 32 to reduce the chamber volume to a lesser volume when necessary or desirable. The insert 100 is cylindrical, and has an outside cylindrical surface 102 which slidably fits into the main chamber 32. The length of the insert 100 is such that the insert closely fits in an inside length of the main chamber 32, in order to minimize the movement of the insert during discharge of the air gun 10. The insert 100 is constructed of a light weight plastic or a metal to minimize both the overall weight of the air gun 10 and the inertia of the insert. Installation of the insert 100 is accomplished by removing a split clamp 104, see also FIG. 2, breaking a seal 106, removing a portion 108 of the body 18, and inserting the insert 100 into the main chamber 32. This permits uncomplicated adjustment of the volume of the main chamber 32.

In operation, FIGS. 1, 1A, 1B, the on-deck compressor (not shown) injects pressurized air (typically 2000 to 3000 psi) into the air gun 10 through the supply hose 86. The air flows to the return chamber 66 through the connecting passage 90. The air acts on the end 40 of the shuttle 12, and moves the shuttle in a closing direction along a single axis designated A, until the primary flange 36 of the shuttle contacts the face seal 54 of the main chamber 32 and the secondary flange 38, simultaneously contacts the secondary port 48, which seals the main chamber 32 with seal 109.

At the same time, air from the return chamber 66 flows through the small passage 92 in the center of the shuttle 12, and enters the main chamber 32. After a few seconds, the air pressure in the main chamber 32 is equal to the air pressure in the supply line 86 and the air gun 10 is now ready to fire. The shuttle 12 is held in the closed position by the pressure in the return chamber 66 acting on the area of the end 40 of the shuttle. The net pressure force in the main chamber 32 which acts against the flanges 36 and 38, and the net force which the return chamber 66 generates, constitutes a force system. The force, F, with which the system holds the shuttle 12 in place, may be calculated as follows:

$$F = F_{sc} - F_p$$

Where:

Fsc = the force which pressurized air in the return chamber 66 exerts on the end 40 (this is equal to the chamber pressure multiplied by the area of the end 40 $(\pi/4(D3)^2)$) where D3 = the shaft end 40 diameter; and Fp = the opening force which the pressure in the main chamber 32 generates as it acts on the area $\pi/4[(D2)^2 - (D4)^2]$ where D2 = seal 54 diameter and D4 = flange 38 diameter.

When the on-deck compressor (not shown) fully charges the main chamber 32 with air, the holding force, F, amounts to several thousand pounds.

An electrical current, which the solenoid 16 receives, triggers the air gun 10 by causing the solenoid to open and allow air from the main chamber 32 to flow to the firing chamber 96, FIG. 1A. When pressurized air in the solenoid 16 acts against the primary flange 36, this substantially increases the area against which pressure applies to open the main chamber 32. Because the area against which air pressure applies to open the main chamber 32 (calculated as $\pi/4[(D1)^2 - (D2)^2]$, ignoring hydrostatic pressure, where D1 = flange 36 diameter and D2 = seal diameter 54 now much greater than the area against which air pressure applies to close the main chamber 32 (calculated as $\pi/4(D3)^2$, again ignoring hydrostatic pressure), the air generates a large opening force against the shuttle 12. As the shuttle 12 moves along axis A away from the face seal 54, air from the main chamber 32 flows into the firing chamber 96, maintaining the opening force against the primary flange 36. The force continues, accelerating the primary and secondary flanges 36 and 38 away from their respective annular shoulders 18a and 18b, until the primary flange clears the primary chamber lip 30, and the shuttle 12 attains a very high velocity. Simultaneously, the secondary flange 38 clears the secondary lip 98, thus permitting the air in the main chamber 32 to flow from both end ports 46 and 48.

Figure 3:
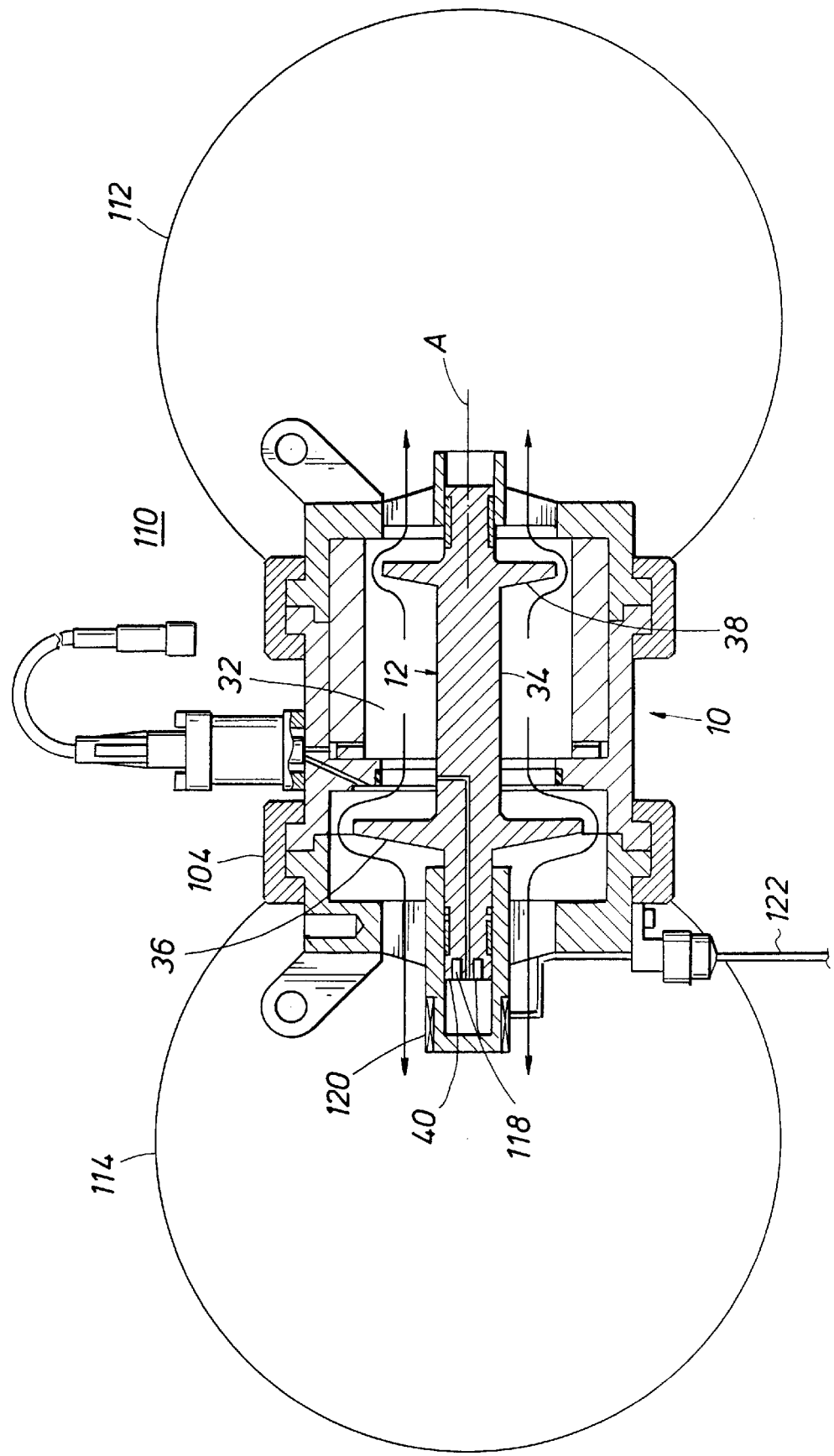
FIG. 3 is a cross-sectional side view illustrating the air gun of FIG. 1 in an open position.

Referring now to FIG. 3, as the air flows into a surrounding water environment 110, two air bubbles 112 and 114 form, one at each end of the air gun 10. The diameters (i.e., bubble-to-water interfaces) of the two air bubbles 112 and 114 accelerate at such a high velocity that the surrounding water cannot move out of the way fast enough, thus generating an acoustic pressure wave. The acoustic pressure wave or pulse continues to build until each bubble diameter reaches its maximum velocity. At this point in time, the acoustic pressures which transfer through the water reach a peak. The overall acoustic pressure pulse is the sum of these two pressure waves. As the bubbles 112 and 114 continue to expand, they contact each other and coalesce into a single bubble. This phenomenon, the clustered air gun phenomenon, is well known in the art. This phenomenon occurs as closely spaced multiple air gun bubbles coalesce to provide the bubble oscillation period of a single air gun, equal to the sum of the two or more multiple air gun volumes. This phenomenon greatly attenuates the bubble collapse, and reduces an undesirable secondary bubble acoustic pulse. The initial acoustic pressure pulse is near the sum of the individual cluster gun's pressure waves, which is greater than that of a single air gun of the same total volume.

The shuttle 12 continues to open until the pressure in the return chamber 66, acting on the end 40, brings the shuttle to a stop. At this point, the opening force on the shuttle 12 is essentially zero because the pressure in the main chamber 32 is down to almost ambient pressure. The force, generated by pressurized air in the return chamber 66, moves the shuttle 12 back to its closed position in which the primary and secondary flanges 36 and 38 close their respective ports 46 and 48. Thus, the main chamber 32 seals and the on-deck compressor quickly recharges the air gun 10, readying it for subsequent firing.

A shuttle monitoring system monitors individual air guns and synchronizes the discharge of multiple air guns. The shuttle monitoring system includes magnets 118, a timing coil 120, an electrical cable 122, and the on-deck monitor (not shown). As the shuttle 12 opens, magnets 118 in the end 40 of the shaft portion 34 generate an electrical signal in the surrounding timing coil 120. The electrical signal conducts through the electrical cable 122 to the on-deck monitor. This permits the firing synchronization of the air gun 10 to be monitored. This is necessary to maintain the synchronization of multiple air guns in an air gun array. The signal also provides a monitor to detect whether the air gun 10 actually fired or "self-fired" (fired when not triggered).

As it can be seen, the principal advantages of these embodiments are that the air gun not only provides a greater acoustic pressure pulse but also has a higher Primary-to-Bubble Ratio. The Primary-to-Bubble ratio is the ratio of the primary peak acoustic pulse or oscillation to the first bubble peak acoustic pulse or oscillation (due to the "clustered air gun phenomenon"). Thus, compared with the primary pulse, the first bubble peak acoustic pulse is minimized. The air gun doubles the air gun discharge port size while using only a single shuttle, thus greatly increasing the acoustic pressure which the air gun generates (i.e., the air gun generates higher acoustic pressure because it doubles the total exhaust area of the air gun). A shuttle monitor is provided for individual air gun monitoring and multiple air gun synchronization. Only one shuttle monitor is required, making it compatible with existing air gun control units. The air gun ensures synchronization and firing repeatability of the shuttle due to the unitary construction of the shuttle, a more compact design which is lighter in weight and easier to handle and provides for easy maintenance. For example removal of a single split clamp allows replacement of the wear rings and seals. The air gun enables longer wear life because the primary and secondary flanges attach to the same shaft portion, thus providing a greater length-to-diameter ratio than possible with dual-shuttle air guns. An increase in the length-to-diameter ratio reduces bearing loading and permits a near pressure-balanced shuttle. In addition, the air gun provides greater reliability by enabling designers to locate wear rings on a single concentric shaft. Further, because of the greater length-to-diameter ratio of the wear rings, designers can justify specifying a more costly, more wear resistant material such as a polyamide-imide or polyetheretherketone, both of which are available from Amoco Polymers Inc., of Atlanta, Ga. The near "pressure balanced" shuttle has a very large port flow area, yet requires a relatively small opening force. The air gun enables a means of adjusting the volume of the main chamber by installing a simple, light weight, cylinder-shaped insert.

Although illustrative embodiments have been shown and described, a wide range of modification, change, and substitution is contemplated in the foregoing disclosure and in some instances, some features of the embodiments may be employed without a corresponding use of the other features. Accordingly, it is appropriate that the appended claims be construed broadly and in a manner consistent with the scope of the embodiments disclosed herein.

What is claimed is:

1. A seismic air gun comprising:
   a body defining a pressurized air inlet and a main chamber having two ports at opposite ends of the main chamber;
   a shuttle mounted in the body and responsive to pressurized air to move between an open position and a closed position;
   a return device in the body responsive to pressurized air to move the shuttle to the closed position; and
   a firing chamber adjacent the main chamber, into which pressurized air is selectively injected to move the shuttle to the open position releasing pressurized air through the two ports and into a surrounding environment.

2. The seismic air gun as defined in claim 1 wherein the firing chamber is adjacent one of the ports.

3. The seismic air gun as defined in claim 1 wherein the ports are at opposite ends of the main chamber and are positioned along a common axis.

4. The seismic air gun as defined in claim 3 wherein the shuttle moves along the common axis.

5. The seismic air gun as defined in claim 1 wherein air injected into the firing chamber is controlled by a solenoid.

6. The seismic air gun as defined in claim 1 wherein air entering the inlet passes through a first passageway into the return device and passes through a second passageway into the main chamber.

7. The seismic air gun as defined in claim 1 wherein pressurized air released through the ports is directed in opposite directions.

8. The seismic air gun as defined in claim 1 further comprising a volume reducing insert mounted within the main chamber.

9. The seismic air gun as defined in claim 1 further comprising a sensor for sensing movement of the shuttle to permit monitoring firing synchronization of the air gun.

10. The seismic air gun as defined in claim 1 further comprising a seal and a clamping device for maintaining the main chamber sealed.

11. A seismic air gun comprising:
    a body defining a main chamber having two ports at opposite ends of the main chamber, the body further defining a pressurized air inlet spaced from the two ports;
    a single shuttle mounted in the body responsive to pressurized air to move the shuttle within the main chamber along a line between the two ports, between an open position, in which the shuttle simultaneously opens the two ports, and a closed position, in which the shuttle simultaneously closes the two ports;
    a return device in the body responsive to pressurized air to move the shuttle to the closed position; and
    a firing chamber, adjacent one of the ports, into which pressurized air is selectively injected to move the shuttle to the open position releasing air simultaneously through the two ports and into a surrounding environment.

12. The seismic air gun as defined in claim 11 wherein the ports are positioned along a common axis.

13. The seismic air gun as defined in claim 12 wherein the shuttle moves along the common axis.

14. The seismic air gun as defined in claim 11 wherein air injected into the firing chamber is controlled by a solenoid.

15. The seismic air gun as defined in claim 11 wherein air entering the inlet passes through a first passageway into the return device and passes through a second passageway into the main chamber.

16. The seismic air gun as defined in claim 11 wherein pressurized air released through the ports is simultaneously directed in opposite directions.

17. The seismic air gun as defined in claim 11 further comprising a volume reducing insert mounted within the main chamber.

18. The seismic air gun as defined in claim 11 further comprising a sensor for sensing movement of the shuttle to permit monitoring firing synchronization of the air gun.

19. The seismic air gun as defined in claim 11 further comprising a seal and a clamping device for maintaining the main chamber sealed.

20. A seismic air gun comprising:
    a body defining a main chamber having at least two ports on opposite ends of the body, and a pressurized air inlet;
    a shuttle mounted in the body responsive to pressurized air to reciprocate along a single axis to move the shuttle between an open position and a closed position;
    a return device in the body responsive to air pressure to move the shuttle to the closed position;
    a first passageway for conducting pressurized air from the inlet to the return device;

a second passageway for conducting pressurized air from the return device to the main chamber; and a firing chamber, adjacent one of the ports, into which pressurized air is selectively injected from the main chamber to move the shuttle to the open position releasing air simultaneously through the two ports and in opposite directions.

21. A seismic air gun comprising:

a body having a longitudinal axis, the body defining a pressurized air inlet, a main chamber, and at least two ports in fluid communication with the main chamber, wherein the two ports are longitudinally spaced from one another;

a shuttle mounted in the body and responsive to pressurized air to move between an open position and a closed position;

a return device in the body responsive to pressurized air to move the shuttle to the closed position; and a firing chamber adjacent the main chamber, into which pressurized air is selectively injected to move the shuttle to the open position, releasing pressurized air simultaneously through the at least two ports.

22. The gun of claim 21 wherein the at least two ports are spaced from one another a distance greater than or equal to the linear dimension of the shuttle along its movement path.

* * * * *

UNITED STATES PATENT AND TRADEMARK OFFICE
CERTIFICATE OF CORRECTION

PATENT NO. :  5,825,719

DATED     :  October 20, 1998

INVENTOR(s) :  Earnest R. Harrison, Jr.

It is certified that error appears in the above-identified patent and that said Letters Patent is hereby corrected as shown below:

Col. 1, line 11 "compressed stat e" should be --compressed state--

Col. 1, line 27 "shot," should be --same shot,--

Col. 4, line 5 "now much" should be --is now much--

Signed and Sealed this

Twenty-third Day of March, 1999

Attest:

Q. TODD DICKINSON

Attesting Officer

Acting Commissioner of Patents and Trademarks